Nov. 24, 1964  R. P. ALEXANDER ET AL  3,158,655
ORGANOBORON ALCOHOLS AND METHOD FOR THEIR PREPARATION
Filed March 25, 1959
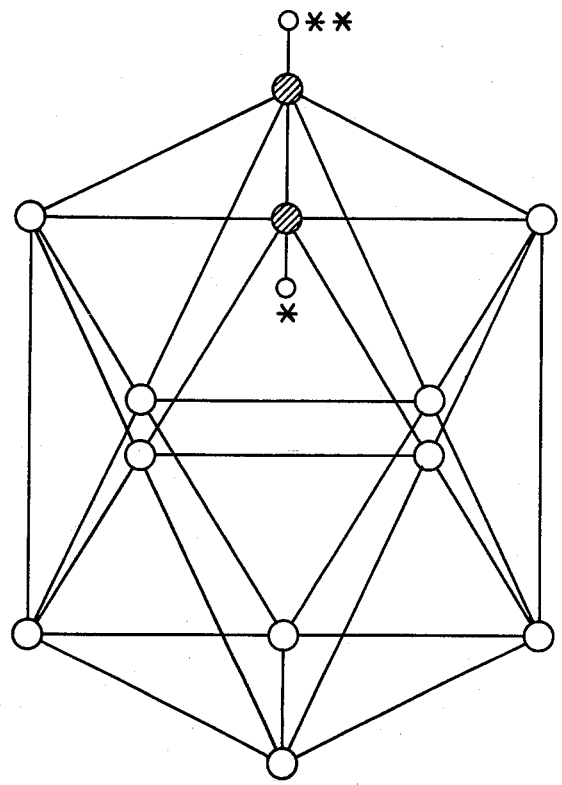
○ BORON
◉ CARBON
○ HYDROGEN ON CARBON
(HYDROGEN ATOMS ON
BORON OMITTED FOR
CLARITY)
INVENTORS
ROY P. ALEXANDER
THEODORE L. MEYING
BY
*Adams Forward and McLean*
ATTORNEYS

United States Patent Office 3,158,655
Patented Nov. 24, 1964

3,158,655
ORGANOBORON ALCOHOLS AND METHOD FOR THEIR PREPARATION
Roy P. Alexander, Lewiston, and Theodore L. Heying, Tonawanda, N.Y., assignors to Olin Mathieson Chemical Corporation, a corporation of Virginia
Filed Mar. 25, 1959, Ser. No. 801,961
9 Claims. (Cl. 260—606.5)

This invention relates to organoboron alcohols and to a method for their preparation. The organoboron alcohols are prepared by the alkaline hydrolysis of compounds of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, halogen, alkyl and haloalkyl radicals, at least one of R'' and R''' being a halogen atom, the total number of carbon atoms in R'' and R''' taken together not exceeding eight. The reaction products prepared by the method of this invention can be either liquid or solid and are useful as fuels.

Compounds of the above class can be prepared by the reaction of decaborane or an alkylated decaborane having 1 to 2 alkyl groups containing 1 to 5 carbon atoms in each alkyl group with an acetylenic compound containing 2 to 10 carbon atoms and from 1 to 2 halogen atoms in the presence of any of a wide variety of amines, ethers, nitriles or sulfides. The preparation of these compounds is described in application Serial No. 797,810, filed March 6, 1959, by John W. Ager, Jr., Theodore L. Heying, and Donald J. Mangold and issued as U.S. Patent No. 3,133,121 on May 12, 1964.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, by Elmar R. Altwicker, Alfred B. Garrett, Samuel W. Harris and Earl A. Weilmuenster and issued as U. S. Patent No. 2,199,117 on Sept. 5, 1961.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without distintegration when ignited by conventional means, such as a pyrotechnic type igniter, and are mechanically strong enough to withstand ordinary handling.

The liquid products of this invention can be used as fuels according to the method described in the above application Serial No. 497,407. A major advantage of these new liquid products is the high stability they exhibit at elevated temperatures. One of the shortcomings of many high energy fuels is their limited stability at the high temperatures sometimes encountered in their use. The liquid products prepared by the method of this invention, however, exhibit relatively little decomposition even after having been maintained at elevated temperatures for extended periods, thus rendering them well suited for more extreme conditions of storage and use. The liquid products of this invention are also of high density.

In accordance with this invention, it was discovered that halogen containing organoboron compounds of the above class can be hydrolyzed by reaction with an aqueous lower alkanol solution of an alkali metal hydroxide to produce organoboron alcohols.

Lower alkanols which can be used are methanol ethanol, n-propanol, isopropanol, n-butanol, isobutanol, and tertiary butanol, the reactants not being as soluble in the higher alkanols.

Potassuim hydroxide is preferred as the alkali metal hydroxide because it is more soluble in the lower alkanol but other alkali metal hydroxides such as sodium and lithium hydroxides can be used.

The hydrolysis appears to proceed only with respect to the 1-halo derivatives. With respect to the other halogen derivatives, there is either no reaction or the halogen is replaced by hydrogen. Moreover, the hydrolysis proceeds satisfactorily only where an aqueous lower alkanol solution is employed in which the proportion of water ranges from about 30% to about 70% by volume. Aqueous alkaline hydrolysis in the absence of alcohol produces little reaction while alcoholic alkaline hydrolysis using very little water results in the replacement of the halogen atom by a hydrogen atom. Preferably the proportion of water in the aqueous lower alkanol solution ranges from 40% to 60% by volume, 50% by volume being most preferred. Separation of the product is then accomplished by acidification of the solution or precipitation of the product from the solution, followed by removal of the product.

The ratio of reactants in the hydrolysis of the halogen containing organoboron compounds can be varied widely generally being in the range of from 0.01 to 10 moles of alkali metal hydroxide per equivalent of halogen (i.e., per mole of halogen liberated by the hydrolysis) and preferably in the range of from 1 to 6 moles of alkali metal hydroxide per equivalent of halogen. Sufficient aqueous alcohol can be present to produce a solution containing 1 percent alkali metal hydroxide to a saturated solution of alkali metal hydroxide. The reaction temperature can vary widely, generally being from 0 to 150° C. and preferably between 20 and 80° C. The reaction pressure can vary from subatmospheric to several atmospheres, i.e., from 0.2 to 20 atmospheres, although atmospheric pressure reactions are convenient. The degree of completeness of the reaction can be determined by analysis of the reaction mixture. The reaction generally requires from one-tenth to fifty hours and preferably from one to thirty hours, depending upon the ratio of reactants, the particular reactants and solvents employed and the temperature and pressure of the reaction.

The process of the invention is illustrated in detail by the following examples.

Example I 0.5 g. (0.0019 mole) of

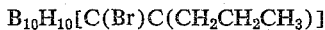
$B_{10}H_{10}[C(Br)C(CH_2CH_2CH_3)]$ 10 ml. (0.556 mole) of water, and 10 ml. of 4 percent potassium hydroxide (0.0071 mole) in methanol were refluxed for 30 hours. The resulting solution was neutralized with hydrochloric acid and the methanol was evaporated from the solution. The solution was extracted with ether. The ether extract was dried over $MgSO_4$ and evaporated, leaving a clear oil. Mass spectrometric analysis of the oil indicated the presence of $B_{10}H_{10}[C(OH)C(CH_2CH_2CH_3)]$

Example II 5.0 g. (0.019 mole) of $B_{10}H_{10}[C(Br)C(CH_2CH_2CH_3)]$, 
50 ml. (2.78 moles) of water, and 50 ml. of 4 percent potassium hydroxide (0.0355 mole) in methanol were refluxed with stirring for 24 hours. The resulting mixture was filtered, giving 0.3 g. of a white solid (probably $B_{10}H_{10}(CHCCH_2CH_2CH_3)$). More water was added to the filtrate and the methanol was distilled out of the solution. The resulting solution was neutralized with hydrochloric acid and extracted with ether. The ether solution was dried with $MgSO_4$ and evaporated. After evaporation 1.7 g. of clear liquid remained. Infrared analysis of the clear liquid indicated the presence of a hydroxyl group.

In another experiment 0.5 g. (0.0019 mole) of $B_{10}H_{10}[C(Br)C(CH_2CH_2CH_3)]$ was refluxed for 35 hours with 15 cc. of a 10% aqueous sulfuric acid solution. 0.3 gram of the starting material was recovered.

The compound of the formula

$$B_{10}H_{10}[C(OH)C(CH_2CH_2CH_3)]$$

prepared as described in Example I has the same structural formula as shown in the accompanying drawing with the exception that the hydrogen atom indicated by a single asterisk is replaced by a hydroxyl radical, —OH, and the hydrogen atom indicated by a double asterisk is replaced by the radical —$CH_2CH_2CH_3$.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operation under these widely varying conditions.

In normal aircraft gas turbine practice it is customary to burn the fuel, under normal operation conditions, at overall fuel-air rates by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.202 for hydrocarbons before entrance into the turbine section. For the higher energy fuels of the present invention, the local fuel to air ratio in the zone of fuel injection should also be approximately stoichiometric, assuming that the boron, halogen, carbon and hydrogen present in the products burn to boric oxide, hydrogen halide, carbon dioxide and water vapor. In the case of the

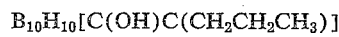
$$B_{10}H_{10}[C(OH)C(CH_2CH_2CH_3)]$$

for example, this local fuel to air ratio by weight is approximately 0.081. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the after-burner may also occur under these conditions of extreme altitude operation with conventional aircraft fuels.

We claim:

1. A method for the productin of an organoboron alcohol compound useful as a fuel which comprises hydrolyzing by reaction with an aqueous lower alkanol solution of an alkali metal hydroxide, wherein the proportion of water in the aqueous lower alkanol solution ranges from about 30% to about 70% by volume, a compound of the class $RR'B_{10}H_8(CR''CR''')$ wherein R and R' are each selected from the class consisting of hydrogen and an alkyl radical containing from one to five carbon atoms, wherein R'' and R''' are each selected from the class consisting of hydrogen, halogen, alkyl, and haloalkyl radicals, at least one of R'' and R''' being a halogen atom, the total number of carbon atoms in R'' and R''' taken together not exceeding eight.

2. The method of claim 1 wherein the proportion of water in the aqueous lower alkanol solution is about 50% by volume.

3. The method of claim 1 wherein the lower alkanol is methanol.

4. The method of claim 1 wherein the alkali metal hydroxide is potassium hydroxide.

5. The method of claim 1 wherein the lower alkanol is methanol and the alkali metal hydroxide is potassium hydroxide.

6. The method of claim 1 wherein the compound is $B_{10}H_{10}[C(Br)C(CH_2CH_2CH_3)]$.

7. The method of claim 2 wherein the lower alkanol is methanol, wherein the alkali metal hydroxide is potassium hydroxide, and wherein the compound is $B_{10}H_{10}[C(Br)C(CH_2CH_2CH_3)]$.

8. $RR'B_{10}H_8(CR''CR''')$ wherein R and R' are each selected from the class consisting of hydrogen and an alkyl radical containing from 1 to 5 carbon atoms and wherein R'' and R''' are each selected from the class consisting of hydrogen, alkyl radicals, hydroxyl radicals and haloalkyl radicals, at least one of R'' and R''' being a hydroxyl radical, the total number of carbon atoms in R'' and R''' taken together not exceeding eight.

9. $B_{10}H_{10}[C(OH)C(CH_2CH_2CH_3)]$.

No references cited.